US010581767B1

(12) United States Patent
Desai et al.

(10) Patent No.: US 10,581,767 B1
(45) Date of Patent: Mar. 3, 2020

(54) SYSTEMS AND METHODS FOR EMAIL JOURNALING

(71) Applicant: Veritas Technologies LLC, Mountain View, CA (US)

(72) Inventors: Hrishikesh Desai, Pune (IN); Mukesh Panchauli, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 788 days.

(21) Appl. No.: 14/862,183

(22) Filed: Sep. 23, 2015

(51) Int. Cl.
  *H04L 12/58* (2006.01)
  *G06Q 10/10* (2012.01)
(52) U.S. Cl.
  CPC ............ *H04L 51/04* (2013.01); *H04L 51/22* (2013.01); *H04L 51/28* (2013.01); *G06Q 10/107* (2013.01)
(58) Field of Classification Search
  CPC ........ G06Q 10/107; H04L 51/22; H04L 51/28
  See application file for complete search history.

(56) References Cited

U.S. PATENT DOCUMENTS

| | | | | |
|---|---|---|---|---|
| 8,856,241 | B1 * | 10/2014 | Derhak | G06Q 10/107 709/206 |
| 9,185,059 | B1 * | 11/2015 | Ervin, Jr. | H04L 51/00 |
| 2003/0101284 | A1 * | 5/2003 | Cabrera | H04L 43/0811 719/313 |
| 2006/0075051 | A1 * | 4/2006 | Jain | G06Q 10/107 709/206 |
| 2012/0023180 | A1 * | 1/2012 | Fukuoka | G06Q 10/10 709/206 |
| 2013/0018963 | A1 * | 1/2013 | Brauff | G06Q 10/107 709/206 |

OTHER PUBLICATIONS

"USN Journal", https://en.wikipedia.org/wiki/USN_Journal, as accessed Sep. 1, 2015, Wikipedia, (Jan. 17, 2010).
"Electronic message journaling", https://en.wikipedia.org/wiki/Electronic_message_journaling, as accessed Sep. 1, 2015, Wikipedia, (Sep. 12, 2010).

(Continued)

*Primary Examiner* — Jeong S Park
(74) *Attorney, Agent, or Firm* — FisherBroyles, LLP

(57) ABSTRACT

A computer-implemented method for email journaling may include (1) maintaining, by a journaling mail server, a cache that associates together an update sequence number that indicates a version of an email distribution list and email addresses that are both designated as targets for journaling and included within the version of the email distribution list identified by the update sequence number, (2) receiving, by the server, an email that includes, within at least one header field, a candidate update sequence number and an email distribution list identifier, (3) determining that the update sequence number in the cache is a match for the candidate update sequence number in the header field, and (4) identifying, based on the match between the update sequence number and the candidate update sequence number, the email addresses specified in the cache as the targets for journaling. Various other methods, systems, and computer-readable media are also disclosed.

20 Claims, 8 Drawing Sheets

(56) References Cited

OTHER PUBLICATIONS

"Envelope Journaling", https://www.mailarchiva.com/help/display/MAIL/Envelope+Journaling, as accessed Sep. 1, 2015, MailArchiva, (On or before Sep. 1, 2015).
Torrisi, Matt, "Email Delivery: What Is an X-Header?", http://dyn.com/blog/what-are-x-headers-email-delivery-101-why-do-they-matter/, as accessed Sep. 1, 2015, (Jul. 18, 2013).
"Simple Mail Transfer Protocol", https://en.wikipedia.org/wiki/Simple_Mail_Transfer_Protocol, as accessed Sep. 1, 2015, Wikipedia, (Jan. 27, 2004).
"Active Directory", https://en.wikipedia.org/wiki/Active_Directory, as accessed Sep. 1, 2015, Wikipedia, (May 6, 2004).
"Amazon CloudFront", https://aws.amazon.com/cloudfront/, as accessed Sep. 1, 2015, Amazon Web Services, Inc., (Dec. 1, 2008).

\* cited by examiner

Report
402

Header
404

Sent: Friday, September 9, 2008 10:48 AM
To: Sales Group; Betty Lyman
Cc: Kristin Bradshaw Attachment: Sales Prediction.msg 

Body
406

Sender: bryan@techbusiness.com
Subject: Sales Prediction
Message-Id:
<04323ASDFASD9823EAD98ASD98@ex2.techbusiness.com>
To: betty@techbusiness.com
To: david@techbusiness.com, Expanded: salesgroup@techbusiness.com
To: george@techbusiness.com, Expanded: salesgroup@techbusiness.com
To: maria@techbusiness.com, Expanded: salesgroup@techbusiness.com
To: michael@techbusiness.com, Expanded: salesgroup@techbusiness.com
To: norman@techbusiness.com, Expanded: salesgroup@techbusiness.com
To: steven@techbusiness.com, Expanded: salesgroup@techbusiness.com
To: tyler@techbusiness.com, Expanded: salesgroup@techbusiness.com
To: zachary@techbusiness.com, Expanded: salesgroup@techbusiness.com
Cc: kristin@techbusiness.com
Cc: sarah@techbusiness.com, Forwarded: kristin@techbusiness.com

*FIG. 4*

SYSTEMS AND METHODS FOR EMAIL JOURNALING

BACKGROUND

Individuals and organizations often maintain records of their internal and external communications for personal reference and to satisfy regulatory and other compliance standards. Specifically, enterprise organizations may implement email journaling services that "journal" or record some or all emails associated with the organization. In some examples, the email journaling services may forward organization emails to a target journaling email account. In the case of "envelope" email journaling, the services may wrap the organization emails as attachments to journal reports, which may further specify details about the organization emails. These details may include values specified in the original sender field, recipient field, and/or any other fields associated with the emails or included within the email headers.

In some examples, email journaling services may journal emails that specify one or more distribution lists. For example, an organization email may specify a distribution list, such as "sales group," which may indirectly refer to a large number of separate organization email addresses. Nevertheless, not all of the email addresses corresponding to the distribution list may be targets for email journaling. Accordingly, traditional email journaling services may fail to perform optimally along one or more dimensions, as discussed further below. Consequently, the instant disclosure identifies and addresses a need for additional and improved systems and methods for email journaling.

SUMMARY

As will be described in greater detail below, the instant disclosure generally relates to systems and methods for email journaling by, for example, inserting an update sequence number within emails that specify a distribution list to indicate a version of the distribution list. The disclosed systems and methods may then check the update sequence number, at a receiving mail server, to determine whether to bypass a process for matching distribution list email addresses with email addresses targeted for journaling. In bypassing the process for matching the email addresses, the disclosed systems and methods may simply reference cached results of a previous performance of the process for matching email addresses when the update sequence number indicates that the results have not changed, as discussed further below.

In one example, a computer-implemented method for email journaling may include (1) maintaining, by a journaling mail server, a cache that associates together an update sequence number that indicates a version of an email distribution list and email addresses that are both designated as targets for journaling and included within the version of the email distribution list identified by the update sequence number, (2) receiving, by the journaling mail server, an email that includes, within at least one header field, a candidate update sequence number and an email distribution list identifier, the email distribution list identifier identifying the email distribution list, (3) determining that the update sequence number in the cache is a match for the candidate update sequence number in the header field, and (4) identifying, based on the match between the update sequence number and the candidate update sequence number, the email addresses specified in the cache as the targets for journaling.

In one embodiment, the journaling mail server executes a task according to the simple mail transfer protocol. In some examples, identifying the email addresses specified in the cache as the targets for journaling enables the journaling mail server to skip a process for matching email addresses that are designated as targets to email addresses that are included within an expanded list of email addresses for the email distribution list. In some examples, skipping the process for matching email addresses that are designated as targets to email addresses that are included within the expanded list may include reusing cached results from a previous execution of the process for matching.

In some examples, determining that the update sequence number in the cache is a match for the candidate update sequence number in the header field is performed in response to checking for whether the update sequence number in the cache is a match for the candidate update sequence number in the header field.

In one embodiment, the email is formatted according to a protocol that provides for extensible header fields. The email may include the candidate update sequence number and the email distribution list identifier within at least one extensible header field according to the protocol.

In one embodiment, the computer-implemented method may further include receiving, by the journaling mail server, an additional email that may include an additional candidate update sequence number and the email distribution list identifier in a header field. In some examples, the computer-implemented method may further include determining that the update sequence number in the cache is not a match for the additional candidate update sequence number in the header field. In one embodiment, the computer-implemented method may further include, in response to determining that the update sequence number in the cache is not a match, performing a process for matching email addresses that are designated as targets to email addresses that are included within an expanded list of email addresses for the email distribution list. In one embodiment, the computer-implemented method may further include updating the update sequence number in the cache to match the candidate update sequence number in the header field and updating the email addresses in the cache to specify results of performing the process for matching email addresses.

In one embodiment, a system for implementing the above-described method may include (1) a maintenance module, stored in memory, that maintains, as part of a journaling mail server, a cache that associates together an update sequence number that indicates a version of an email distribution list and email addresses that are both designated as targets for journaling and included within the version of the email distribution list identified by the update sequence number, (2) a reception module, stored in memory, that receives, as part of the journaling mail server, an email that may include, within at least one header field, a candidate update sequence number and an email distribution list identifier, the email distribution list identifier identifying the email distribution list, (3) a determination module, stored in memory, that determines that the update sequence number in the cache is a match for the candidate update sequence number in the header field, (4) an identification module, stored in memory, that identifies, based on the match between the update sequence number and the candidate update sequence number, the email addresses specified in the cache as the targets for journaling, and (5) at least one physical processor configured to execute the maintenance module, the reception module, the determination module, and the identification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) maintain, by a journaling mail server, a cache that associates together an update sequence number that indicates a version of an email distribution list and email addresses that are both designated as targets for journaling and included within the version of the email distribution list identified by the update sequence number, (2) receive, by the journaling mail server, an email that includes, within at least one header field, a candidate update sequence number and an email distribution list identifier, the email distribution list identifier identifying the email distribution list, (3) determine that the update sequence number in the cache is a match for the candidate update sequence number in the header field, and (4) identify, based on the match between the update sequence number and the candidate update sequence number, the email addresses specified in the cache as the targets for journaling.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 4 is a block diagram of an exemplary email journal report.

Figure 1:
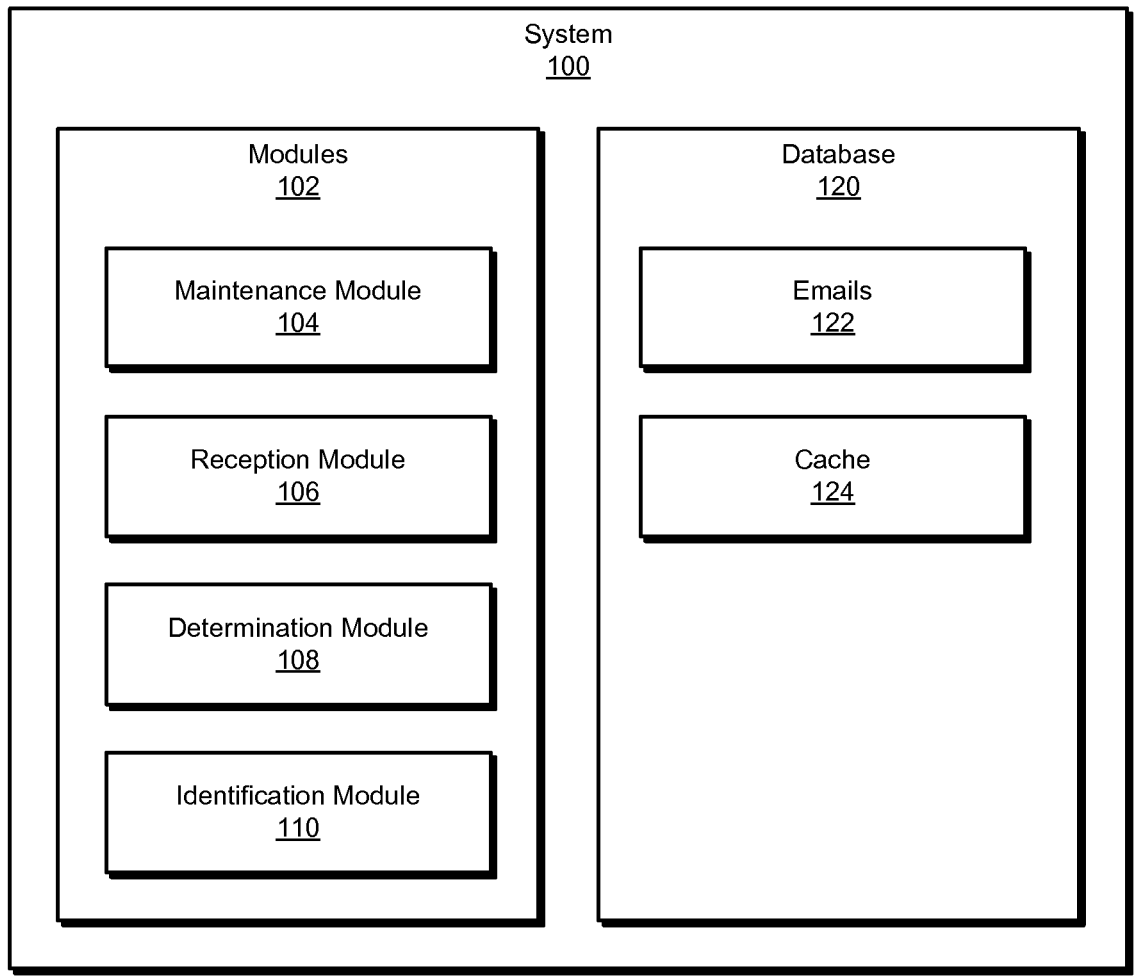
FIG. 1 is a block diagram of an exemplary system for email journaling.

Throughout the drawings, identical reference characters and descriptions indicate similar, but not necessarily identical, elements. While the exemplary embodiments described herein are susceptible to various modifications and alternative forms, specific embodiments have been shown byway of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for email journaling. As will be explained in greater detail below, the systems and methods described herein may improve the efficiency of email journaling services by intelligently skipping a process for matching distribution list email addresses to targeted journaling email addresses when an update sequence number indicates that the distribution list has not changed since a previous instance of performing the matching process. When the update sequence number indicates that the distribution list has not changed, the disclosed systems and methods may simply reference cached results of the previous instance of performing the matching process. Moreover, the disclosed systems and methods may implement this technique for selectively bypassing the matching process by maintaining, updating, inserting, and/or checking the update sequence number within organization emails that are potential targets for email journaling, as discussed further below.

Figure 2:
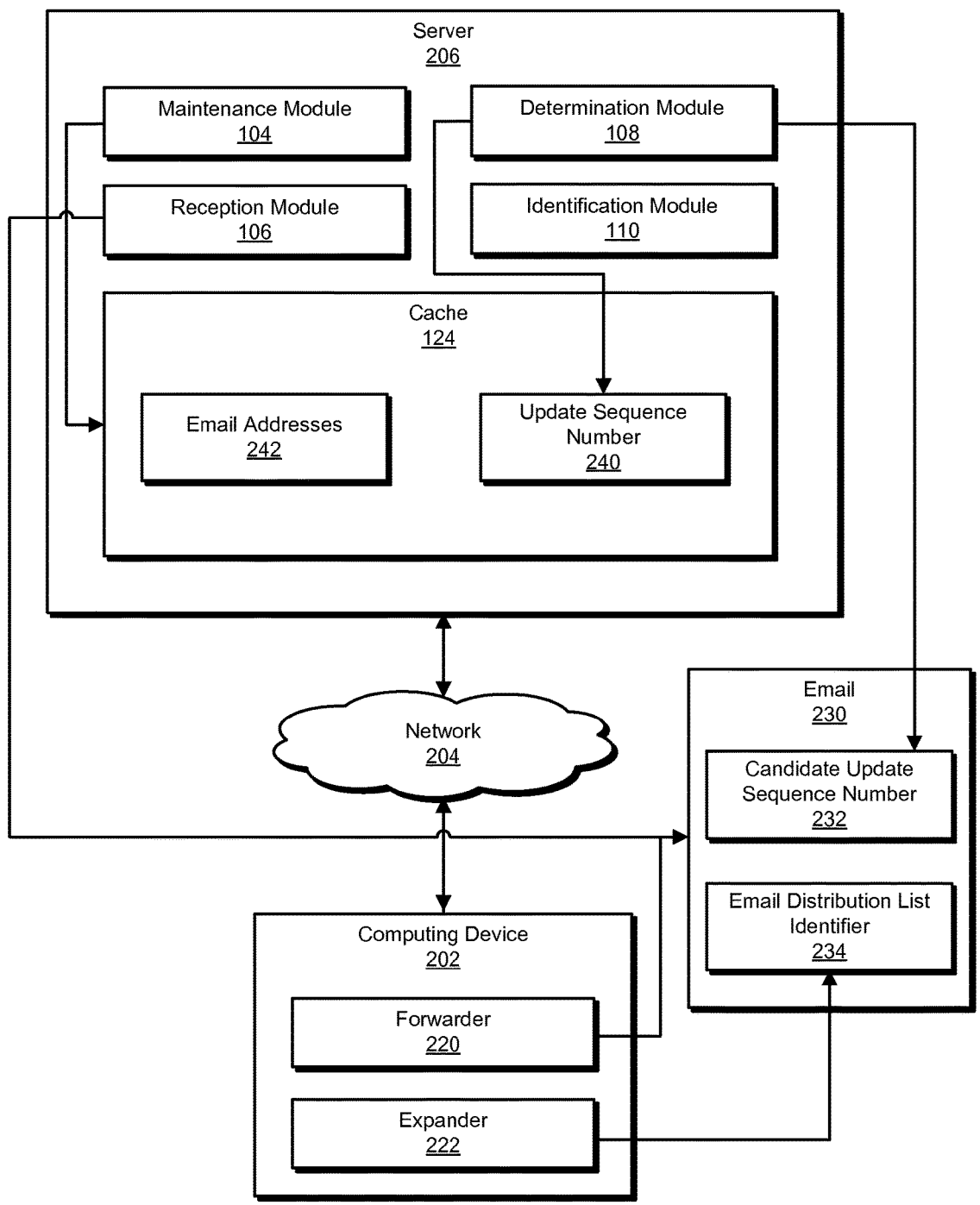
FIG. 2 is a block diagram of an additional exemplary system for email journaling.

The following will provide, with reference to FIGS. 1-2, detailed descriptions of exemplary systems for email journaling. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for email journaling. As illustrated in this figure, exemplary system 100 may include one or more modules 102 for performing one or more tasks. For example, and as will be explained in greater detail below, exemplary system 100 may also include a maintenance module 104 that may maintain, as part of a journaling mail server, a cache that associates together an update sequence number that indicates a version of an email distribution list and email addresses that are both designated as targets for journaling and included within the version of the email distribution list identified by the update sequence number. Exemplary system 100 may additionally include a reception module 106 that may receive, as part of the journaling mail server, an email that includes, within at least one header field, a candidate update sequence number and an email distribution list identifier, the email distribution list identifier identifying the email distribution list. Exemplary system 100 may also include a determination module 108 that may determine that the update sequence number in the cache is a match for the candidate update sequence number in the header field. Exemplary system 100 may additionally include an identification module 110 that may identify, based on the match between the update sequence number and the candidate update sequence number, the email addresses specified in the cache as the targets for journaling. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store emails 122, which may correspond to internal and/or external emails associated with an enterprise organization, as discussed further below. Similarly, database 120 may also be configured to store a cache 124, which may further store an update sequence number and/or matching email addresses that match both a version of a distribution list (e.g., as identified by the update sequence number) and a target list for journaling emails. As used herein, the term "cache" generally refers to any memory module that may store these items of information for future reference to thereby enable email journaling services to bypass needless instances of performing the matching process, as discussed further below.

Database 120 may represent portions of a single database or computing device or a plurality of databases or computing devices. For example, database 120 may represent a portion of server 206 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by at least one processor of computing device 202 and/or server 206, enable computing device 202 and/or server 206 to perform email journaling. For example, and as will be described in greater detail below, maintenance module 104 may maintain, as part of server 206, a cache 124 that associates together (A) an update sequence number 240 that indicates a version of an email distribution list and (B) email addresses 242 that are both designated as targets for journaling and included within the version of the email distribution list identified by the update sequence number. Reception module 106 may receive, as part of server 206, an email 230 that includes, within at least one header field, a candidate update sequence number 232 and an email distribution list identifier 234. Email distribution list identifier 234 may identify the email distribution list (i.e., the email distribution list corresponding to email addresses 242). Determination module 108 may determine that update sequence number 240 in cache 124 is a match for candidate update sequence number 232 in the header field. Identification module 110 may identify, based on the match between update sequence number 240 and candidate update sequence number 232, email addresses 242 specified in cache 124 as the targets for journaling.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of facilitating the journaling of emails. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Notably, in the example of FIG. 2, modules 102 are located server-side at server 206. In other embodiments, one or more of modules 102 and cache 124 may be located on another device, such as another server device, proxy device, peripheral device, and/or client device, according to any suitable combination or permutation of networked devices that together may perform method 300 to achieve its intended functionality.

As further shown in FIG. 2, computing device 202 may also include a forwarder 220 and an expander 222. Forwarder 220 within computing device 202 may (e.g., as part of a mail transport server) forward email 230 to server 206 and also insert the candidate update sequence number. In some examples, computing device 202 may constitute one mail server, such as a MICROSOFT EXCHANGE MAIL SERVER, that first receives email 230. Upon receiving email 230, expander 222 may expand email distribution list identifier 234 to specify or designate each of the email addresses within the set of email addresses identified by email distribution list identifier 234, as discussed above. In these examples, expander 222 may replace and/or supplement email distribution list identifier 234 with the expanded set of email addresses. Accordingly, upon receiving email 230, server 206 may identify each of the email addresses within the expanded set of email addresses transmitted from computing device 202 after the expansion by expander 222. When performing the process of matching email addresses according to FIG. 5 (i.e., when server 206 does not bypass the matching process because candidate update sequence number 232 is new or unknown), server 206 may parse the expanded set of email addresses to search and identify an updated set of email addresses 242, as discussed further below. In these and other examples, server 206 may execute a task according to the simple mail transfer protocol. In other words, server 206 may correspond to a simple mail transfer protocol mail server that receives emails from computing device 202 (e.g., an EXCHANGE server) for forwarding and routing according to the simple mail transfer protocol.

Notably, computing device 202 may maintain and update the update sequence number for one or more email distribution lists. Similarly, computing device 202 may insert the current and up-to-date update sequence number for an email distribution list within an email that specifies the email distribution list. Additionally, computing device 202 (e.g., as an EXCHANGE SERVER) may provide a centralized location for defining and revising the email distribution list. Accordingly, when computing device 202 first receives email 230, computing device 202 may have direct knowledge of both the current and up-to-date update sequence number for the email distribution list as well as the current and up-to-date set of email addresses corresponding to the email distribution list.

Notably, because the update sequence number is maintained and updated by computing device 202, situations will arise in which the corresponding update sequence number 240 stored within cache 124 is stale, old, or out of date. For example, server 206 may receive a first email that specifies one update sequence number (e.g, "002") for an email distribution list. After receiving the first email, computing device 202 may receive and process a request to revise the contents of the email distribution list. Accordingly, computing device 202 may revise (i.e., add an email address to the email distribution list or remove an email address from the email distribution list) and then update the update sequence number (i.e., update the update sequence number from "002" to "003"). In this example, server 206 may thereafter receive another email that specifies the new update sequence number (i.e., "003"), because computing device 202 has updated the update sequence number but server 206 has yet to do so. When this happens, the update sequence number of the new email will not match the previous update sequence number stored within cache 124 (i.e., because "003" does not match "002"). Accordingly, server 206 may determine that it can no longer rely on the stale or outdated email addresses 242 within cache 124 and must instead perform the matching process of FIG. 5, as outlined in more detail below.

Figure 3:
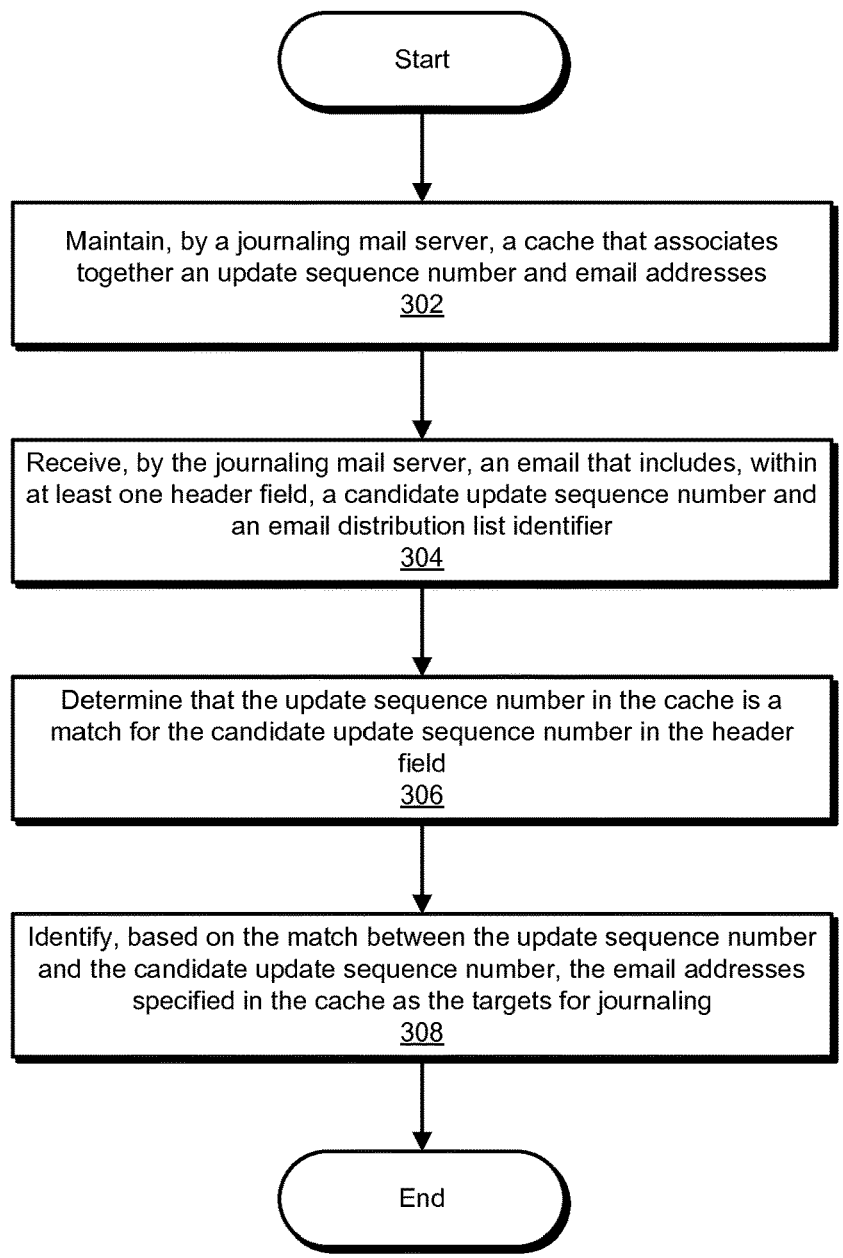
FIG. 3 is a flow diagram of an exemplary method for email journaling.

FIG. 3 is a flow diagram of an exemplary computer-implemented method 300 for email journaling. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 710 in FIG. 7, and/or portions of exemplary network architecture 800 in FIG. 8.

As illustrated in FIG. 3, at step 302, one or more of the systems described herein may maintain, by a journaling mail server, a cache that associates together (A) an update sequence number that indicates a version of an email distribution list and (B) email addresses that are both designated as targets for journaling and included within the version of the email distribution list identified by the update sequence number. For example, maintenance module 104 may, as part of server 206 in FIG. 2, maintain cache 124 that associates together (A) update sequence number 240 that indicates a version of an email distribution list and (B) email addresses 242 that are both designated as targets for journaling and included within the version of the email distribution list identified by update sequence number 240.

As used herein, the term "email distribution list" generally refers to a set of email addresses that are associated together, by an email server or email system, to enable a user to conveniently reference all of the email addresses in the set by simply referencing a name or identifier for the email distribution list. As one example, an email distribution list may correspond to a sales group within an enterprise organization. The email distribution list may have the name "sales group." The email distribution list may also refer to four different email addresses that are associated with four different employees within the sales group of the enterprise organization. Accordingly, a user may conveniently send an email to all four of the employees within the sales group by simply referencing the name or identifier for the email distribution list without separately typing or specifying the email addresses for each of the four different employees.

As used herein, the term "update sequence number" generally refers to any number or symbol that an email journaling service may reference to distinguish between different versions of an email distribution list. In general, the update sequence number uniquely specifies each version of the distribution list after each change to the distribution list. In some examples, an additional change to the distribution list may revert it to a previous version, in which case two different update sequence numbers may both indicate the same version of the distribution list (i.e., the same version of the distribution list at two different points in time). As one example, the update sequence number "001" may designate the first version of an email distribution list. After a change to the email distribution list, such as adding or removing an email address, the update sequence number may be updated to "002" to specify the revised distribution list after the change. In further examples, the update sequence number may be specified in an update sequence number field (e.g., "DL-USN-info") which may specify the update sequence number and/or the nature of the revision to the distribution list. In some examples, the disclosed systems may still reference cache 124, and bypass the matching process (discussed further below for FIG. 5), even when the update sequence number is not a match, if the field specifies the nature of the change to the update sequence number such that the systems may revise the information in the cache to accommodate the revisions without repeating the matching process.

As used herein, the term "targets for journaling" generally refers to email addresses that an email journaling service has specified or designated for journaling such that, when the email journaling service encounters or receives emails that specify the email address (e.g., specify the email address within any header field or within a predefined header field), the email journaling service then records the associated emails within its journal or journal report. For example, when the email journaling service receives an email that specifies an email address that is a target for journaling then the email journaling service may wrap the email as an attachment to a journal report, as outlined above. In general, the email journaling service may forward or transmit the journal report with the associated attachment to a destination email account for recording, journaling, and/or archiving such emails. In contrast, email journaling services may also encounter or receive emails that are not targets for journaling. In this case, the email journaling services may simply forward or discard those emails without performing any recording or journaling.

Notably, the email journaling service may specify rules that indicate which emails (e.g., some, all, etc.) are targets for journaling based on both the content of specified email addresses and the location of the specified email addresses within the emails. Rules that distinguish between emails to journal and email to not journal may indicate that the email journaling service is in "selective" mode. As one specific example, rules may specify that the email address "john@business.com" causes emails to be targets for journaling when that email address appears in a "sender" field but not when it appears in a "recipient" field. In other examples, the rules may specify that the emails are targets whenever the email address appears within any field.

Maintenance module 104 may maintain the items of information within the cache in a variety of ways. In general, maintenance module 104 may store the update sequence number and the email addresses within a structure, format, record, column, and/or row that indicates or designates the correlation or association between the two items of information. For example, both items of information may be stored within two different fields of the same data structure, thereby indicating that the two items of information correspond to each other. Maintenance module 104 may also store the two items of information in a manner that makes each item of information findable and retrievable based on searching for the other associated item of information (i.e., searching for the email addresses associated with the update sequence number or vice versa).

By way of background, FIG. 4 shows an example of an email journaling report 402 that further includes a header 404 and a body 406. As further shown in this figure, header 404 may specify a date and timing of sending a corresponding email message, which may be attached to report 402 according to the envelope method of email journaling, as discussed above. In this example, the attached email may have the file name "Sales Prediction.msg". Header 404 may also specify an email distribution list (i.e., "Sales Group") as a target recipient in the "To:" field as well as a single email address account (i.e., "Betty Lyman") within the same "To:" field. Similarly, header 404 may also specify another single email address account (i.e., "Kristin Bradshaw") in the "Cc:" field.

Additionally, FIG. 4 also shows information within body 406 of report 402. Body 406 further specifies the sender of the corresponding email (i.e., "Bryan"), the subject line "Sales Prediction"), the message identifier, and the specific email addresses corresponding to those within the "To:" and "Cc:" fields of the associated email, as described above. Notably, within body 406 of report 402, the email distribution list identifier (i.e, "Sales Group") has been expanded to further specify numerous other particular email addresses that belong to that identified email distribution list. These expanded email addresses are indicated within body 406 by the "Expanded" keyword.

At step 304, one or more of the systems described herein may receive an email that includes, within at least one header field, a candidate update sequence number and an email distribution list identifier. The email distribution list identifier may identify the email distribution list. For example, reception module 106 may, as part of server 206 in FIG. 2, receive email 230 that includes, within at least one header field, candidate update sequence number 232 and email distribution list identifier 234.

As used herein, the term "candidate update sequence number" generally refers to any candidate sequence number (as further defined above) that has the potential to match or not match update sequence number 240 stored within cache 124, as discussed further below. Similarly, as used herein, the term "journaling mail server" generally refers to any mail server that facilitates or performs email journaling, as further described above. Additionally, as used herein, the term "email distribution list identifier" generally refers to any information that server 206 receives within system 200 such that system 200 can pick out or identify the email distribution list corresponding to candidate update sequence number 232.

In some examples, candidate update sequence number 232 and email distribution list identifier 234 may be stored in the same email header field or different email header fields (or, alternatively, in the email body, such as a prescript or postscript insertion). Additionally, in some examples, candidate update sequence number 232 and email distribution list identifier 234 may be stored contiguously to each other or appended to each other. In one specific example, the term "SG002" may constitute the combination of email distribution list identifier 234 ("SG" referring to the "sales group" email distribution list) and candidate update sequence number 232 ("002"). In other examples, candidate update sequence number 232 and email distribution list identifier 234 may be stored separately or separated by one or more spaces, lines, breaks, headers, and/or fields.

In further examples, the overall email system may only contain or refer to a single email distribution list, in which case candidate update sequence number 232 may also constitute email distribution list identifier 234. As a more specific example, if the overall email system only includes a single email distribution list for the sales force, then a candidate update sequence number of "002" may designate both the email distribution list (i.e., the sales group distribution list) as well as the update sequence number for that distribution list.

Reception module 106 may receive email 230 in a variety of ways. For example, reception module 106 may receive email 230 in response to computing device 202 (e.g., as an EXCHANGE server) forwarding email 230 for email routing purposes after computing device 202 expanded email distribution list identifier 234 using expander 222. In general, reception module 106 may receive email 230 from computing device 202, which forwarded email 230 using forwarder 220. Server 206 may be configured to receive emails from computing device 202 and forward or route them according to the simple mail transfer protocol, as discussed above.

In some examples, the email may be formatted according to a protocol that provides for extensible header fields. For example, the extensible header fields may constitute X-HEADER fields as defined by a mail server such as EXCHANGE. In some examples, the extensible header fields may specify strings. In general, extensible header fields may enable a user, administrator, and/or computing or network resource to insert metadata, attributes, and/or other information into an email (e.g., after the user clicks send and/or by a node after the originating node on the network). Extensible header fields may specify further information that the overall email system may use to process the emails. In this example, the extensible header fields may specify candidate update sequence number 232 and/or email distribution list identifier 234, as further discussed above.

At step 306, one or more of the systems described herein may determine that the update sequence number in the cache is a match for the candidate update sequence number in the header field. For example, determination module 108 may, as part of server 206 in FIG. 2, determine that update sequence number 240 in cache 124 is a match for candidate update sequence number 232 in the header field. As used herein, the phrase "is a match" generally refers to candidate update sequence number 232 being identical to update sequence number 240 or otherwise indicating, within system 200, that these two items of information refer to the same version of the email distribution list.

Determination module 108 may determine that the update sequence number in the cache is a match for the candidate update sequence number in the header field in a variety of ways. In some examples, determination module 108 may determine that the update sequence number in the cache is a match for the candidate update sequence number in the header field in response to checking for whether the update sequence number in the cache is a match.

Figure 5:
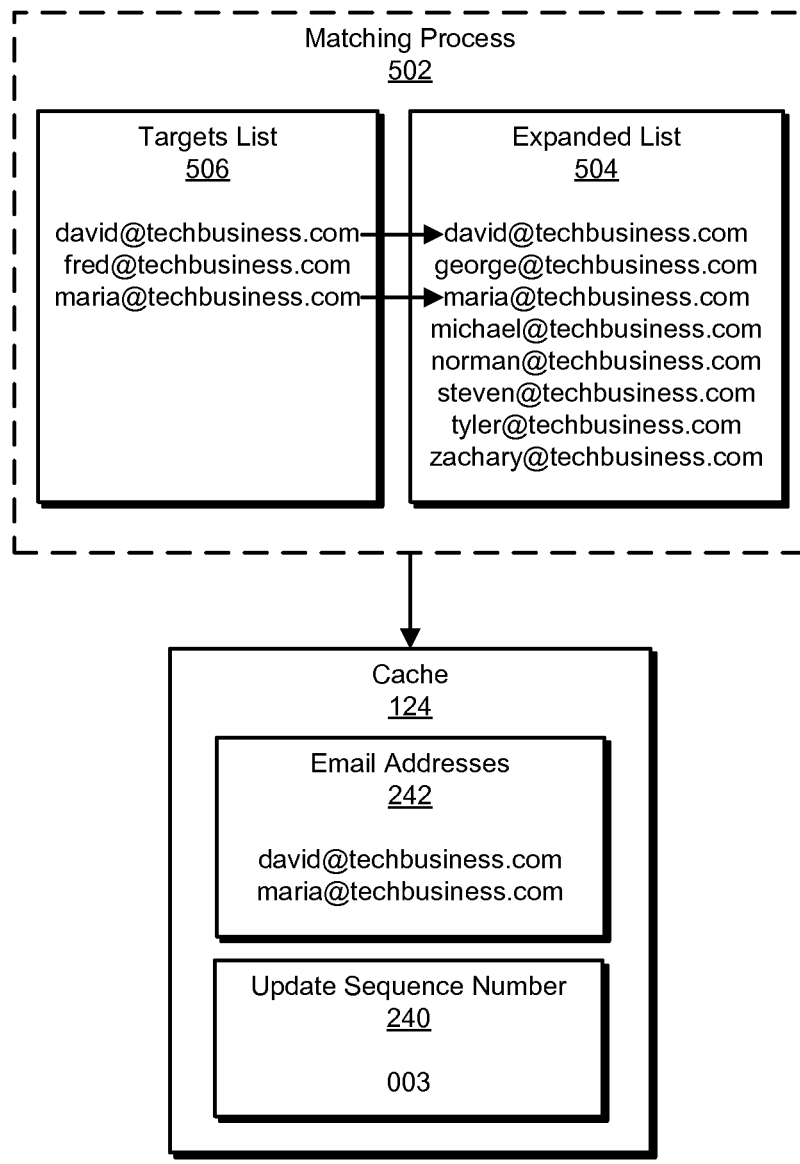
FIG. 5 is a block diagram of an exemplary process for matching email addresses.

FIG. 5 shows an illustration of two different sources of information that determination module 108 and/or identification module 110 may use to identify which emails and/or email addresses to journal. First, determination module 108 and/or identification module 110 may perform a matching process 502, as in other email journaling services without the benefits of the improved systems disclosed herein.

According to matching process 502, one or more computing resources may first process an email distribution list identifier to create an expanded list 504 of corresponding email addresses. For example, expander 222 in computing device 202 may perform the expansion process. After the expansion process is complete, another computing resource, such as server 206, may parse expanded list 504 (which server 206 may have received from computing device 202) and then search expanded list 504 and/or a targets list 506 for email addresses that are located within both lists. Targets list 506 may specify email addresses that are targets for journaling, as first outlined above. Moreover, targets list 506 may be stored locally within server 206 or otherwise accessible to server 206. Furthermore, server 206 may use any suitable technique or algorithm for identifying the common or matching email addresses between targets list 506 and expanded list 504. In the specific example of FIG. 5, the email addresses for David and Maria are located in both targets list 506 and expanded list 504.

In some enterprise emailing systems, expanded list 504 may contain dozens, hundreds, or thousands of email addresses (the specific example of FIG. 5 is simplified for ease of discussion and explanation). In contrast, targets list 506 may specify a relatively smaller number of email addresses, such as three in the example of FIG. 5. Moreover, in some enterprise emailing systems, expanded list 504 and/or targets list 506 may change on a rare or infrequent basis. In other words, some email systems may repeat matching process 502 over and over despite the fact that the results of matching process 502 remain the same each time so long as targets list 506 and expanded list 504 remain the same.

In view of the above, a second source of information for identifying which emails and/or email addresses are targets for journaling corresponds to cache 124. As further shown in FIG. 5, cache 124 may include both email addresses 242 and update sequence number 240. Email addresses 242 may specify the email addresses for both David and Maria, which are the two email addresses that are common to targets list 506 and expanded list 504, as further discussed above. In other words, cache 124 may store email addresses 242 to indicate the results of a previous instance of performing matching process 502.

Going forward, identification module 110 may reference email addresses 242 within cache 124 as a faster and more efficient method for identifying those email addresses, instead of repeating matching process 502, when determination module 108 determines that targets list 506 and/or expanded list 504 has not changed. For example, determination module 108 may identify candidate update sequence number 232 (e.g., "003") and then check whether it is a match for update sequence number 240 ("003") stored within cache 124. In this specific example, determination module 108 may determine that these two items of information are a match for each other, thereby indicating that expanded list 504 has not changed since the previous performance of matching process 502 that created the results of email addresses 242 stored within cache 124.

At step 308, one or more of the systems described herein may identify, based on the match between the update sequence number and the candidate update sequence number, the email addresses specified in the cache as the targets for journaling. For example, identification module 110 may, as part of server 206 in FIG. 2, identify, based on the match between the update sequence number and the candidate update sequence number, email addresses 242 specified in cache 124 as the targets for journaling.

As used herein, the phrase "identify the email addresses as the targets for journaling" refers to picking out, from among an expanded list of email addresses for a corresponding email distribution list, which of those email addresses are specified as targets for journaling, such that emails specifying those email addresses should be reported, recorded, and/or archived (i.e., using the journal report process described above for FIG. 4), as opposed to other email addresses that are not targets for journaling. In other words, upon receiving email 230, server 206 may not immediately understand whether to perform a journaling action or process (e.g., sending report 402) for email 230. To determine whether to perform the journaling action, server 206 may first determine whether email 230 specifies an email address that is a target for journaling. In the case that email 230 specifies email distribution list identifier 234, the corresponding expanded set of email addresses may include hundreds or thousands of email addresses. Accordingly, the process of parsing and/or searching to determine which of those hundreds or thousands of email addresses are targets for journaling may become slow and inefficient. Consequently, the disclosed systems and methods may reference candidate update sequence number 232 to determine whether the slow and inefficient process for searching the hundreds or thousands of email addresses may be bypassed by simply referencing previously stored results of the matching process within cache 124, as discussed further below.

In some examples, by identification module 110 identifying the email addresses specified in the cache as the targets for journaling, identification module 110 may enable the journaling mail server to skip a process (i.e., matching process 502) for matching email addresses that are designated as targets (i.e., targets list 506) to email addresses that are included within expanded list 504 of email addresses for the email distribution list. Additionally, identification module 110 may bypass the process for matching email addresses that are designated as targets to email addresses that are included within an expanded list of email addresses for the email distribution list by reusing cached results (i.e., email addresses 242 stored within cache 124) from a previous execution of the process for matching.

Figure 6:
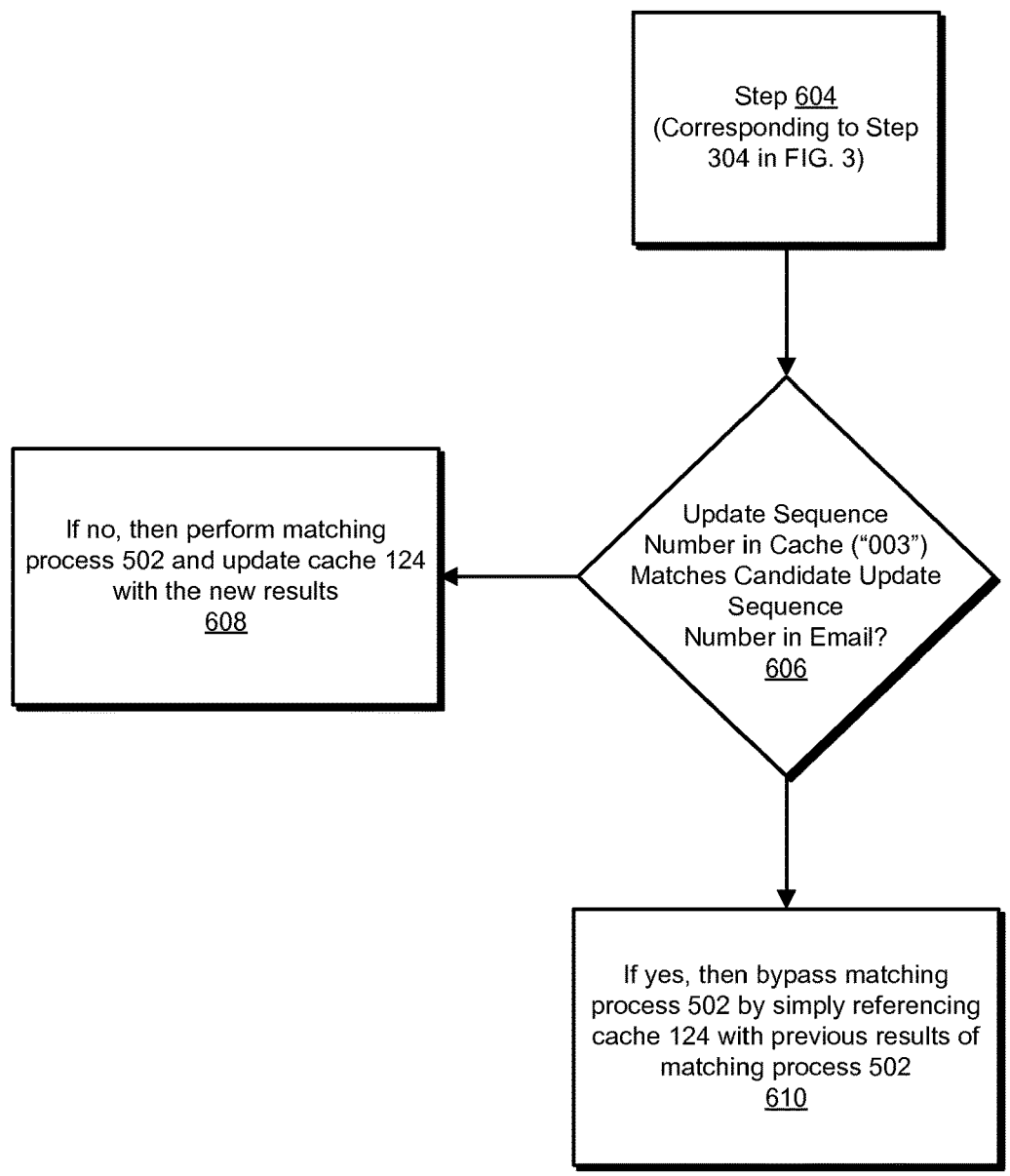
FIG. 6 is a flow diagram of an exemplary method for email journaling.

FIG. 6 shows an exemplary flow diagram for a method 600 that may correspond to steps 304 and/or 306 of method 300. As shown in this figure, method 600 may begin at step 604, which may correspond to step 304 in FIG. 3, at which point reception module 106 receives the email with the candidate update sequence number. At step 606, determination module 108 may determine whether the candidate update sequence number in the received email matches the update sequence number stored within the cache. If these two items of information do not match, then method 600 may proceed to step 608, at which point determination module 108 and/or identification module 110 may perform matching process 502, as outlined above, and then update cache 124 with the updated results of the matching process. In other words, determination module 108 and/or identification module 110 may parse and/or search an updated version of targets list 506 and/or expanded list 504 for matching or common email addresses that are shared between these two lists. Determination module 108 and/or identification module 110 may then revise update sequence number 240 to specify the candidate update sequence number within the received email. Similarly, these modules may update email addresses 242 within cache 124 to specify the new results of the new performance of matching process 502.

In other words, the systems described herein may receive, as part of the journaling mail server, an additional email that includes an additional candidate update sequence number and the email distribution list identifier in a header field. Determination module 108 may determine, at step 606, that the update sequence number in the cache is not a match for the additional candidate update sequence number in the header field. Accordingly, determination module 108 and/or identification module 110 may, at step 608 and in response to determining that the update sequence number in the cache is not a match, perform matching process 502 for matching email addresses that are designated as targets to email addresses that are included within an expanded list of email addresses for the email distribution list. Notably, in this case, server 206 may request and/or receive the up-to-date version of expanded list 504 from computing device 202, the corresponding EXCHANGE server, and/or ACTIVE DIRECTORY.

Notably, the above example refers to an "additional email" that includes a candidate update sequence number that does not match the update sequence number stored within the cache. In other words, the above example refers to situations in which a first email is received with a matching candidate update sequence number and then a second email is received with a non-matching candidate update sequence number. In other examples, the disclosed systems and methods may include situations where a single email is received with a non-matching candidate update sequence number, without necessarily first receiving a matching candidate update sequence number.

In contrast, if the update sequence number in the cache does match the candidate update sequence number in the received email, then method 600 may proceed to step 610, at which point identification module 110 may simply reference cache 124 to identify the targets for journaling while bypassing matching process 502. In other words, identification module 110 may assume that the results of performing matching process 502 would be the same as the results of a previous instance of performing matching process 502, because expanded list 504 has not changed as indicated by the matching candidate update sequence number. Consequently, identification module 110 may simply reference the cached results of the previous instance of performing matching process 502 while bypassing an additional instance of performing matching process 502.

As explained above in connection with method 300 in FIG. 3, the systems and methods described herein may improve the efficiency of email journaling services by intelligently skipping a process for matching distribution list email addresses to targeted journaling email addresses when an update sequence number indicates that the distribution list has not changed since a previous instance of performing the matching process. When the update sequence number indicates that the distribution list has not changed, the disclosed systems and methods may simply reference cached results of the previous instance of performing the matching process. Moreover, the disclosed systems and methods may implement this technique for selectively bypassing the matching process by maintaining, updating, inserting, and/or checking the update sequence number within organization emails that are potential targets for email journaling.

Figure 7:
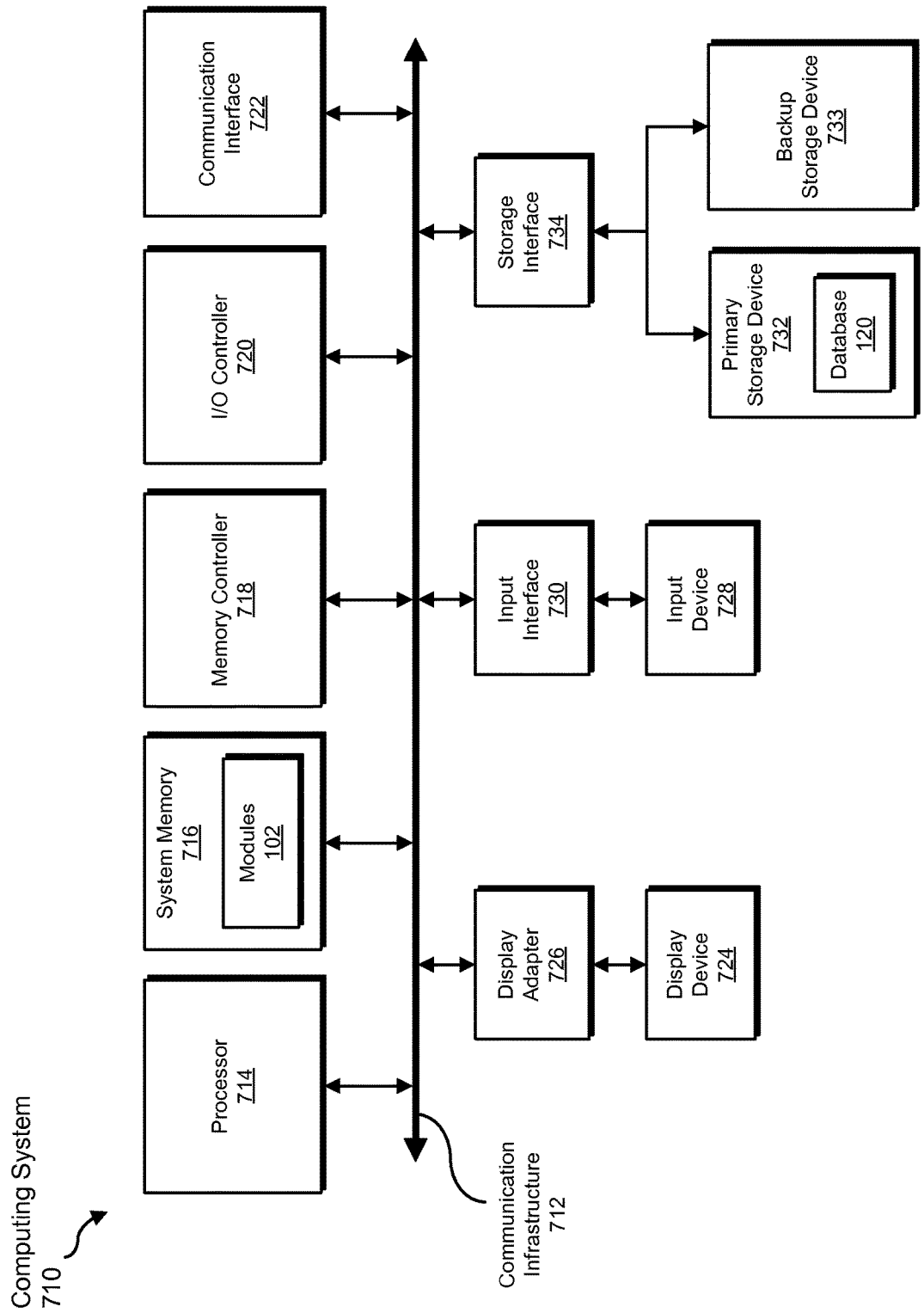
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
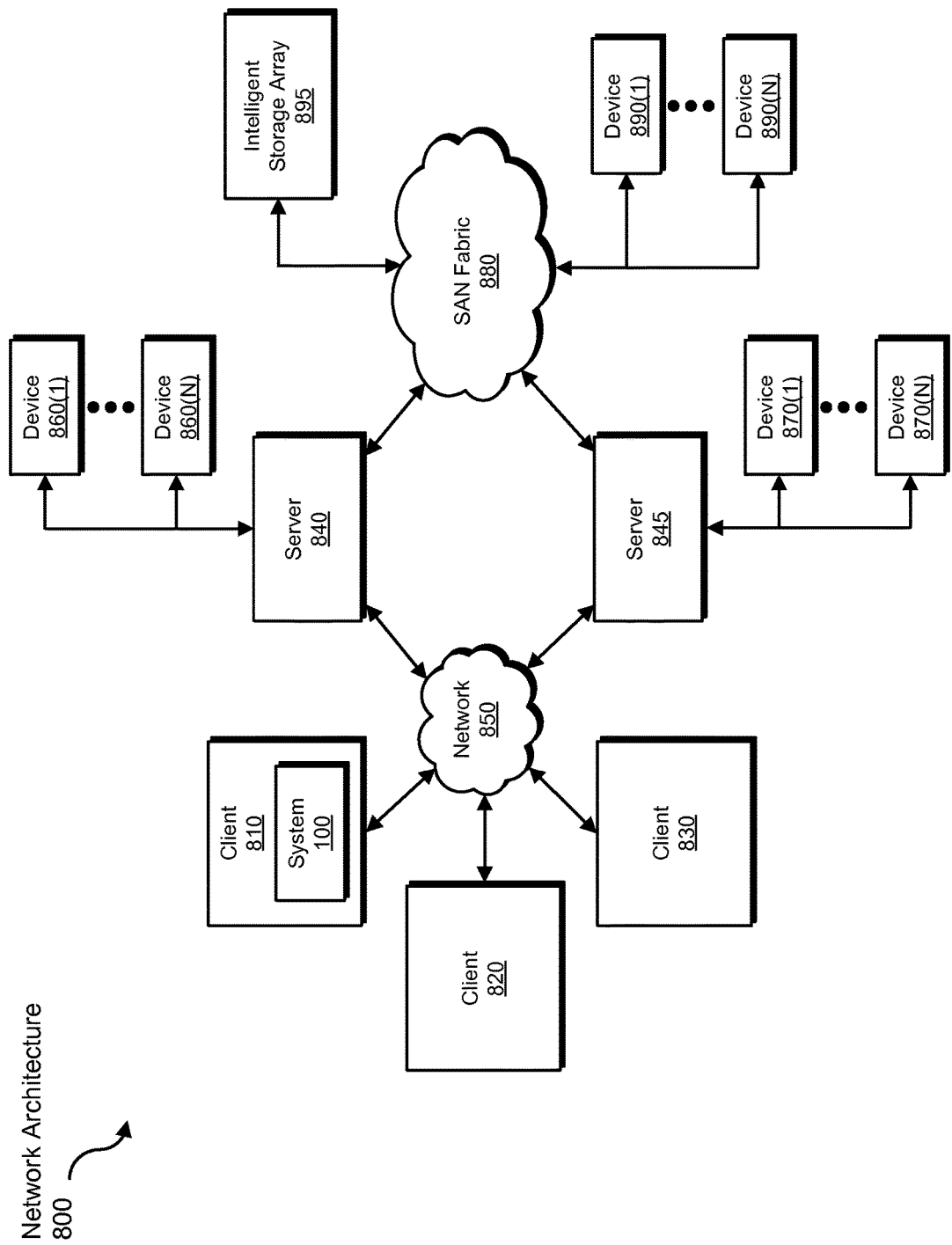
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for email journaling.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive emails, email journal reports, and/or associated configuration information to be transformed, transform one or more of these items of data, output a result of the transformation to a display or output device, use the result of the transformation to improve the efficiency of email journaling services, and store the result of the transformation to a disk or other memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for email journaling, at least a portion of the method being performed by a computing device comprising at least one processor, the method comprising:

maintaining, by a journaling mail server, a cache that associates together:
  an update sequence number that indicates a version of an email distribution list;
  email addresses that are both designated as targets for journaling and included within the version of the email distribution list identified by the update sequence number;
receiving, by the journaling mail server, an email that includes, within at least one header field, a candidate update sequence number and an email distribution list identifier, the email distribution list identifier identifying the email distribution list;
determining that the update sequence number in the cache is a match for the candidate update sequence number in the header field;
identifying, based on the match between the update sequence number and the candidate update sequence number, the email addresses specified in the cache as the targets for journaling.

2. The method of claim 1, wherein the journaling mail server executes a task according to the simple mail transfer protocol.

3. The method of claim 1, wherein identifying the email addresses specified in the cache as the targets for journaling enables the journaling mail server to skip a process for matching email addresses that are designated as targets to email addresses that are included within an expanded list of email addresses for the email distribution list.

4. The method of claim 3, wherein skipping the process for matching email addresses that are designated as targets to email addresses that are included within the expanded list of email addresses for the email distribution list comprises reusing cached results from a previous execution of the process for matching.

5. The method of claim 1, wherein determining that the update sequence number in the cache is a match for the candidate update sequence number in the header field is performed in response to checking for whether the update sequence number in the cache is a match for the candidate update sequence number in the header field.

6. The method of claim 1, wherein:
  the email is formatted according to a protocol that provides for extensible header fields;
  the email includes the candidate update sequence number and the email distribution list identifier within at least one extensible header field according to the protocol.

7. The method of claim 1, further comprising receiving, by the journaling mail server, an additional email that includes an additional candidate update sequence number and the email distribution list identifier in a header field.

8. The method of claim 7, further comprising determining that the update sequence number in the cache is not a match for the additional candidate update sequence number in the header field.

9. The method of claim 8, further comprising, in response to determining that the update sequence number in the cache is not a match, performing a process for matching email addresses that are designated as targets to email addresses that are included within an expanded list of email addresses for the email distribution list.

10. The method of claim 9, further comprising:
  updating the update sequence number in the cache to match the candidate update sequence number in the header field;
  updating the email addresses in the cache to specify results of performing the process for matching email addresses.

11. A system for email journaling, the system comprising:
  a maintenance module, stored in memory, that maintains, as part of a journaling mail server, a cache that associates together:
    an update sequence number that indicates a version of an email distribution list;
    email addresses that are both designated as targets for journaling and included within the version of the email distribution list identified by the update sequence number;
  a reception module, stored in memory, that receives, as part of the journaling mail server, an email that includes, within at least one header field, a candidate update sequence number and an email distribution list identifier, the email distribution list identifier identifying the email distribution list;
  a determination module, stored in memory, that determines that the update sequence number in the cache is a match for the candidate update sequence number in the header field;
  an identification module, stored in memory, that identifies, based on the match between the update sequence number and the candidate update sequence number, the email addresses specified in the cache as the targets for journaling;
  at least one physical processor configured to execute the maintenance module, the reception module, the determination module, and the identification module.

12. The system of claim 11, wherein the journaling mail server executes a task according to the simple mail transfer protocol.

13. The system of claim 11, wherein the identification module identifies the email addresses specified in the cache as the targets for journaling at least in part by enabling the journaling mail server to skip a process for matching email addresses that are designated as targets to email addresses that are included within an expanded list of email addresses for the email distribution list.

14. The system of claim 13, wherein the identification module skips the process for matching email addresses that are designated as targets to email addresses that are included within the expanded list of email addresses for the email distribution list by reusing cached results from a previous execution of the process for matching.

15. The system of claim 11, wherein the determination module determines that the update sequence number in the cache is a match for the candidate update sequence number in the header field in response to checking for whether the update sequence number in the cache is a match for the candidate update sequence number in the header field.

16. The system of claim 11, wherein:
  the email is formatted according to a protocol that provides for extensible header fields;
  the email includes the candidate update sequence number and the email distribution list identifier within at least one extensible header field according to the protocol.

17. The system of claim 11, wherein the reception module receives, as part of the journaling mail server, an additional email that includes an additional candidate update sequence number and the email distribution list identifier in a header field.

18. The system of claim 17, wherein the determination module determines that the update sequence number in the cache is not a match for the additional candidate update sequence number in the header field.

19. The system of claim 18, wherein the identification module, in response to determining that the update sequence number in the cache is not a match, performs a process for matching email addresses that are designated as targets to email addresses that are included within an expanded list of email addresses for the email distribution list.

20. A non-transitory computer-readable medium comprising one or more computer-readable instructions that, when executed by at least one processor of a computing device, cause the computing device to:
- maintain, by a journaling mail server, a cache that associates together:
  - an update sequence number that indicates a version of an email distribution list;
  - email addresses that are both designated as targets for journaling and included within the version of the email distribution list identified by the update sequence number;
- receive, by the journaling mail server, an email that includes, within at least one header field, a candidate update sequence number and an email distribution list identifier, the email distribution list identifier identifying the email distribution list;
- determine that the update sequence number in the cache is a match for the candidate update sequence number in the header field;
- identify, based on the match between the update sequence number and the candidate update sequence number, the email addresses specified in the cache as the targets for journaling.

* * * * *